United States Patent
Koeppler

(10) Patent No.: US 10,450,909 B2
(45) Date of Patent: Oct. 22, 2019

(54) OIL PUMP

(75) Inventor: Peter Koeppler, Bad Vilbel (DE)

(73) Assignee: Continental Automotive GmbH, Munich (DE)

( * ) Notice: Subject to any disclaimer, the term of this patent is extended or adjusted under 35 U.S.C. 154(b) by 801 days.

(21) Appl. No.: 13/984,246

(22) PCT Filed: Feb. 6, 2012

(86) PCT No.: PCT/EP2012/051977
§ 371 (c)(1),
(2), (4) Date: Aug. 7, 2013

(87) PCT Pub. No.: WO2012/107410
PCT Pub. Date: Aug. 16, 2012

(65) Prior Publication Data
US 2013/0315756 A1  Nov. 28, 2013

(30) Foreign Application Priority Data

Feb. 8, 2011 (DE) .......... 10 2011 010 671

(51) Int. Cl.
F04D 13/06 (2006.01)
F01M 1/02 (2006.01)
F04D 29/18 (2006.01)
F16N 13/20 (2006.01)

(52) U.S. Cl.
CPC .............. *F01M 1/02* (2013.01); *F04D 13/06* (2013.01); *F04D 29/181* (2013.01); *F16N 13/20* (2013.01); *F01M 2001/0238* (2013.01)

(58) Field of Classification Search
CPC ... F04D 3/005; F04D 3/00; F04D 3/02; F04D 29/181; F04D 13/06; F04D 29/18; F16N 2013/205; F16N 13/20; F01M 2001/0238
USPC ............................................ 415/208.2, 210.1
See application file for complete search history.

(56) References Cited

U.S. PATENT DOCUMENTS

| 1,596,459 | A | * | 8/1926 | Schmidt | F04D 3/005 415/207 |
|---|---|---|---|---|---|
| 1,688,809 | A | | 10/1928 | Gill | |
| 1,807,397 | A | * | 5/1931 | Fechheimer | F04D 3/00 415/207 |
| 3,023,709 | A | * | 3/1962 | Kondo | F04D 29/181 415/207 |
| 3,073,247 | A | * | 1/1963 | Schroeder | F04D 3/00 415/208.2 |
| 5,681,146 | A | * | 10/1997 | White | F04D 29/181 416/223 R |
| 5,779,444 | A | | 7/1998 | Onigata et al. | |
| 6,991,574 | B2 | * | 1/2006 | Martin, III | B60R 17/00 180/371 |

(Continued)

FOREIGN PATENT DOCUMENTS

| CN | 1085993 | 4/1994 |
|---|---|---|
| CN | 2600621 Y | 1/2004 |

(Continued)

*Primary Examiner* — Bryan M Lettman
*Assistant Examiner* — Charles W Nichols
(74) *Attorney, Agent, or Firm* — Cozen O'Connor

(57) ABSTRACT

An oil pump in a motor vehicle, having a case and an electric motor mounted in the case. The electric motor drives a pump stage which is likewise mounted in the case. The oil pump is an axial flow centrifugal pump.

14 Claims, 2 Drawing Sheets

(56) References Cited

U.S. PATENT DOCUMENTS

| | | | | |
|---|---|---|---|---|
| 2003/0228214 | A1* | 12/2003 | McBride | B63H 11/08 415/191 |
| 2007/0048139 | A1 | 3/2007 | De Oliveira | |
| 2009/0314698 | A1* | 12/2009 | Higbee | B01F 7/00341 210/150 |

FOREIGN PATENT DOCUMENTS

| | | |
|---|---|---|
| CN | 201057169 | 5/2008 |
| CN | 201078352 | 6/2008 |
| CN | 201090458 Y | 7/2008 |
| DE | 196 19 692 A1 | 11/1996 |
| DE | 103 12 978 A1 | 10/2004 |

\* cited by examiner

OIL PUMP

CROSS REFERENCE TO RELATED APPLICATIONS

This is a U.S. national stage of application No. PCT/EP2012/051977, filed on Feb. 6, 2012. Priority is claimed on German Application No. DE102011010671.5, filed Feb. 8, 2011, the content of which is incorporated herein by reference.

BACKGROUND OF THE INVENTION

1. Field of the Invention

The subject matter of the invention is an oil pump in a motor vehicle, having a housing, an electric motor arranged in the housing, and the electric motor drives a pump stage also arranged in the housing.

2. Description of the Prior Art

Such oil pumps are known and are thus prior art. The known oil pumps are positive-displacement pumps with correspondingly high power and volume flow rate. It is also known for oil pumps to be used in transmissions to drive oil circulation in the transmission. In the case of transmissions, it is known that the gear wheels dip into the oil sump, which leads to splashing losses during operation. To reduce the splashing losses, the oil level in the oil sump is lowered during operation by virtue of the oil pump extracting the oil and conveying it to a higher level in the transmission, wherein a volume flow must be managed with a relatively small pressure increase. It is a problem here that the known positive-displacement pumps are overdimensioned for this task, and thus ineffective, owing to their high power consumption. Furthermore, at low temperatures at which the viscosity of the oil greatly increases, the efficiency of a positive-displacement pump decreases further.

SUMMARY OF THE INVENTION

One embodiment of the invention is based on providing an oil pump in a motor vehicle, which oil pump delivers a certain volume flow with a relatively small pressure increase with good efficiency. The oil pump should furthermore be capable of delivering the oil effectively regardless of its present viscosity.

One embodiment of the invention is an oil pump that is an axial-type rotatory pump.

The use of an axial rotatory pump as an oil pump permits the use of a pump with lower power consumption and thus a pump suited to the delivery task.

In one configuration of the vane wheel of the pump, it has been found that the rotatory pump, in the case of a configuration determined by an engineer, does not operate adequately in all operating situations. In particular, at low temperatures, friction losses increase greatly due to the high viscosity of the oil. In one advantageous embodiment, by contrast to the conventional configuration, a pump wheel with a reduced number of vanes is provided. The vanes are designed such that a free region is formed between two adjacent vanes on the circumference of the vane wheel hub, in which free region the fluid to be delivered can pass through freely. This embodiment results in a relatively low delivery rate, for which reason such a vane wheel configuration has not hitherto been implemented. Due to the reduced number of vanes and the free regions, the oil comes into contact with the vanes only to a minor extent. As a result, at low temperatures at which the oil has a high viscosity, significantly lower friction losses are encountered than would be the case with a conventionally designed vane wheel. Since the oil pump only has to provide a low delivery rate, the disadvantage of the lower delivery rate is negligible in relation to the advantage gained as a result of the reduction in friction losses.

Particularly low friction losses at low temperatures and at an adequate delivery rate are attained with an oil pump in which the free regions on the hub circumference of the vane wheel between two vanes account for a total of 25%-70%, preferably 30%-50% and in particular 38%-40%, of the hub circumference.

To deliver oil at low temperatures with low friction losses, it has furthermore advantageously proven to be the case that the free regions must in each case have a certain minimum length. For this reason, the vane wheel should have at least two vanes and no more than four vanes.

To attain an adequate delivery rate, the length of the vanes in the direction of rotation is greater than or equal to their radial width.

In one embodiment, the radial width of the vanes is constant over their length. In this way, the vane wheel can be arranged in a delivery opening or a delivery duct, wherein the inner contour of the opening or of the duct is slightly larger than the vane wheel. Since, in this way, only a small gap forms between the inner contour and the vanes, the delivery rate is further improved.

The ends of the vanes may be of various designs to improve the flow behavior. It has proven to be advantageous for those ends of the vanes which point in the direction of rotation to have a radius whose center is arranged in the vane in relation to the radial width of the vane.

Those ends of the vanes that point opposite the direction of rotation may likewise be rounded. It is however also conceivable for said ends to be of rectilinear or arc-shaped design. In the case of a rectilinear design, the edge may be arranged radially or at an angle which deviates from radial. In the case of an arc-shaped edge, the arc may be concave or convex.

BRIEF DESCRIPTION OF THE DRAWINGS

The invention will be explained in more detail on the basis of an exemplary embodiment. In the figures.

DETAILED DESCRIPTION OF THE PRESENTLY PREFERRED EMBODIMENTS

Figure 1:
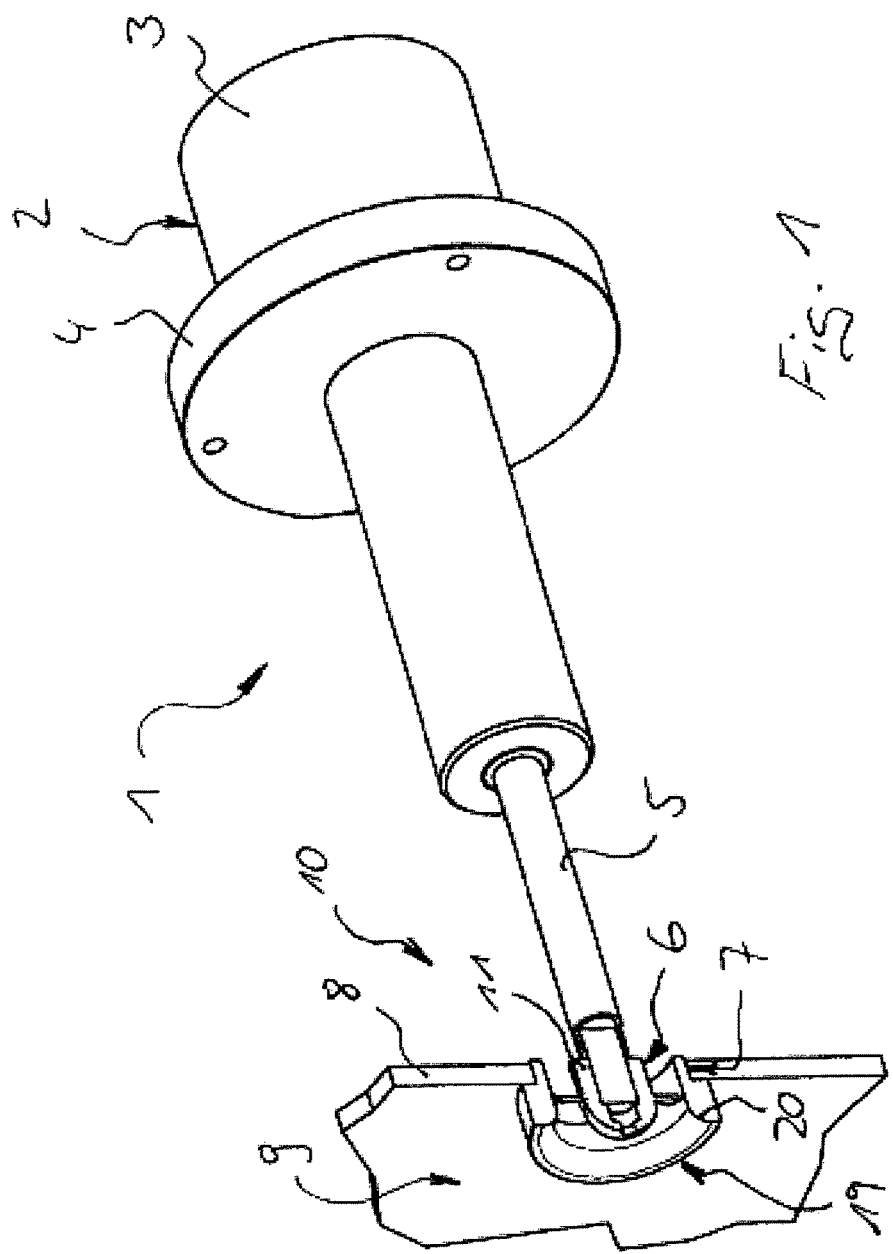
FIG. 1 is a perspective illustration of an oil pump according to the invention.

The oil pump 1 has a housing 2 in which an electric motor 3 is arranged. The housing 2 has a flange 4 by which the oil pump 1 is fastened to a transmission. The electric motor 3 drives a shaft 5 situated in the interior of the transmission. A vane wheel 6 is fastened to that end of the shaft 5 that faces away from the electric motor 3. The vane wheel 6 is surrounded by a tubular outer ring 19, the inner diameter of which is of such a size that a small gap is situated between the inner contour and the vanes 12, 13, which gap permits an unhindered rotation of the vane wheel 6. To improve the flow behavior, the outer ring 19 may have an inlet nozzle 20. The vane wheel 6 is situated in a bore 7 of a partition 8 of the transmission, wherein the partition 8 separates two chambers 9, 10 of the transmission. During the operation of the oil pump 1, the oil situated in the chamber 9 is drawn in and delivered into the chamber 10.

Figure 2:
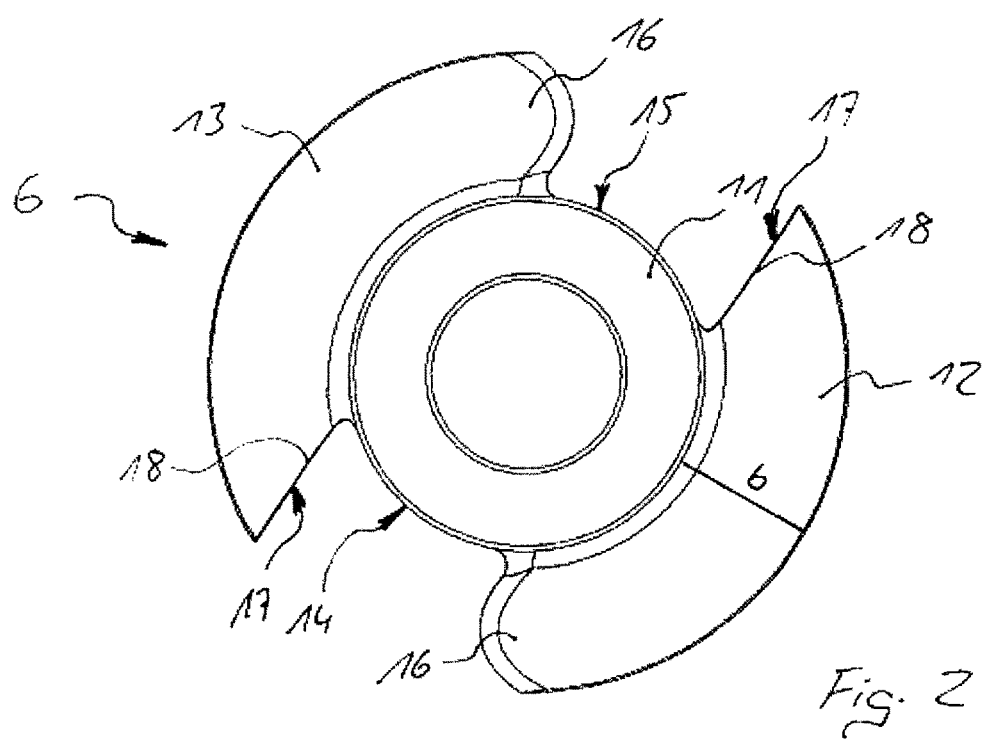
FIG. 2 is the vane wheel of the oil pump of FIG. 1 in a plan view.
Figure 3:
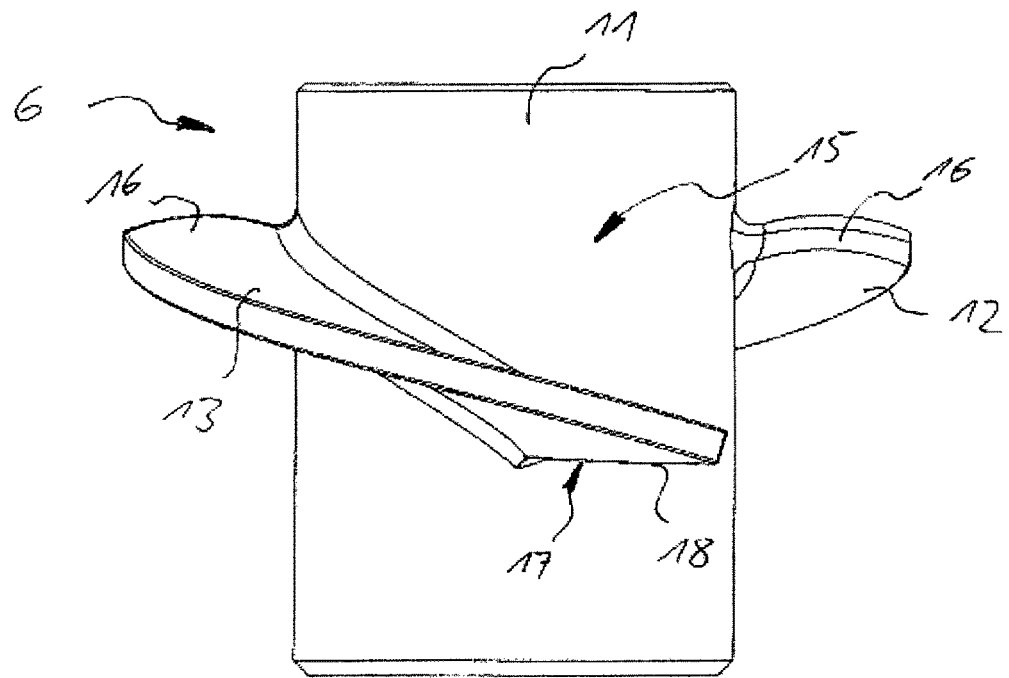
FIG. 3 is the vane wheel of FIG. 1 in a side view.

FIGS. 2 and 3 show the vane wheel 6 with its hub 11. On the circumference of the hub 11, two vanes 12, 13 are arranged spaced apart from one another such that free regions 14, 15 are present between the two vanes 12, 13, in which free regions 14, 15 the vanes 12, 13 do not overlap. By said free regions 14, 15, the oil can pass through the vane wheel such that the contact of the vanes 12, 13 with the oil is minimized, which leads to a reduction in friction losses. The vanes 12, 13 extend around the hub 11 at the circumference thereof over an angular range of in each case 110°, such that the free regions 14, 15 cover an angular range of in each case 70° and account for a total of 39% of the hub circumference. The vanes 12, 13 are rounded at their end 16 pointing in the direction of rotation, whereas the opposite end 17 has a rectilinear edge 18 which is inclined counter to the direction of rotation. The radial width b of the vanes 12, 13 is constant over the length of the vanes 12, 13.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An oil pump in a motor vehicle, comprising:
   a housing;
   an electric motor arranged in the housing;
   a pump stage arranged in the housing and configured to be driven by the electric motor, the pump stage comprising:
   a vane wheel;
   a plurality of vanes arranged on the vane wheel such that at least one free region of about 25%-70% in circumferential direction over an entire axial length of the vane wheel is formed between respective ends of two adjacent vanes on a circumference of the vane wheel,
   wherein the vanes are rectilinear at their respective ends opposite a direction of rotation, and
   wherein the respective rectilinear ends extend from a hub at an incline counter to the direction of rotation, and
   wherein the oil pump is an axial-type rotatory pump;
   a tubular outer ring surrounding the vane wheel, having an inlet nozzle; and
   wherein the inlet nozzle has an input having a first diameter and an outlet having a second diameter that is smaller than the first diameter.

2. The oil pump as claimed in claim 1, wherein the free regions on the circumference of the vane wheel between two vanes account for about 30% 50% of the circumference of the vane wheel.

3. The oil pump as claimed in claim 1, wherein the vane wheel has two to four vanes.

4. The oil pump as claimed in claim 1, wherein a length of the vanes in the direction of rotation is at least equal to a radial width b of the vanes.

5. The oil pump as claimed in claim 1, wherein a radial width b of the vanes is constant over their length.

6. The oil pump as claimed in claim 1, wherein the vanes are rounded at their end pointing in the direction of rotation.

7. The oil pump as claimed in claim 2, wherein the free regions on the circumference of the vane wheel between two vanes account for a total of about 38% 40%, of the circumference of the vane wheel.

8. The oil pump as claimed in claim 1, wherein the hub of the vane wheel is dome-shaped.

9. The oil pump as claimed in claim 1,
   wherein the vanes are curved with a first arc at their ends respective ends in a direction of rotation,
   wherein the respective ends are connected by a second arc portion,
   wherein the first arc and the second arc are different.

10. The oil pump as claimed in claim 9, wherein the hub of the vane wheel is dome-shaped.

11. The oil pump as claimed in claim 6, wherein the rounded end has a radius whose center is arranged in the vane in relation to a radial width of the vane.

12. The oil pump as claimed in claim 6, wherein the rounded end has a first convex portion proximate to the hub and a second concave portion.

13. The oil pump as claimed in claim 1, wherein the inlet nozzle has a partially arcuate portion leading from an input area to the tubular outer ring.

14. The oil pump as claimed in claim 1, wherein the plurality of vanes are arranged at a distance from the an outlet of the inlet nozzle.

* * * * *